United States Patent
Clatanoff et al.

(10) Patent No.: US 6,229,520 B1
(45) Date of Patent: May 8, 2001

(54) DIGITAL PROCESSING FOR RESIZED GRAPHICS IMAGES

(75) Inventors: Todd A. Clatanoff, Allen; Vishal Markandey, Dallas, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/008,170

(22) Filed: Jan. 16, 1998

(51) Int. Cl.[7] .................. G09G 5/00; H04N 7/01; H04N 11/20; H04N 9/74
(52) U.S. Cl. .................. 345/132; 348/453; 348/581
(58) Field of Search .................. 345/112, 418, 345/130, 132, 127, 136, 133, 428, 154, 439, 153, 155, 129, 503; 348/445, 458, 459, 618, 607, 625, 645, 581, 453, 582

(56) References Cited

U.S. PATENT DOCUMENTS

| | | | | |
|---|---|---|---|---|
| 5,606,375 | * | 2/1997 | Lee | 348/607 X |
| 5,682,179 | * | 10/1997 | Cahill | 345/439 |
| 5,717,436 | * | 2/1998 | Cahill | 345/127 |
| 5,754,180 | * | 5/1998 | Kivolowitz et al. | 345/418 |
| 5,812,144 | * | 12/1998 | Potu | 345/439 |
| 5,831,592 | * | 11/1998 | Cahill | 345/127 |
| 5,838,334 | * | 11/1998 | Dye | 345/503 |
| 5,844,541 | * | 12/1998 | Cahill | 345/154 |
| 5,844,545 | * | 12/1998 | Suzuki et al. | 345/112 X |
| 5,886,701 | * | 3/1999 | Chauvin et al. | 345/418 |
| 5,940,141 | * | 8/1999 | Faroudja et al. | 348/625 X |
| 6,002,810 | * | 12/1999 | Wakisawa et al. | 345/130 X |

OTHER PUBLICATIONS

Oraintara et al., "Image/Video Scaling Algorithm Based On Multirate Signal Processing", IEEE, pp. 1–5, 1998.*

* cited by examiner

*Primary Examiner*—Matthew Luu
*Assistant Examiner*—Chante' Harrison
(74) *Attorney, Agent, or Firm*—Charles A. Brill; Wade James Brady III; Frederick J. Telecky, Jr.

(57) ABSTRACT

A method for scaling graphics image data. The method operates on data that is in red-green-blue format. Each component is filtered to extract high pass information and then that information is scaled in amplitude. Finally, the amplitude scaled information is recombined with the original components of the image data. The filtering and amplitude scaling sharpen the scaled image, producing a clearer picture.

7 Claims, 1 Drawing Sheet

DIGITAL PROCESSING FOR RESIZED GRAPHICS IMAGES

BACKGROUND OF THE INVENTION

1. Field of the Invention

This invention relates to image processing, more particularly to image processing for graphics images.

2. Background of the Invention

Graphics data comes in several formats, such as VGA, SVGA, XGA, SXGA, etc., each with a different spatial resolution. For example, VGA has a 640×480 resolution. A problem arises when graphics data of one format and resolution needs to be resized to fit a display system with a different resolution. For example, an image that was formatted for VGA at 640×480 resolution may need to be displayed on a 800×600 resolution display system. This type of problem is becoming more and more prevalent as more options are offered to consumers for display systems.

Graphics data, unlike incoming video data, cannot be resized horizontally by changing the sampling frequency. In the above example, if the input were analog video data, the sampling frequency for that display system would be 800 samples per line instead of 640. Graphics data, however, is originally created in a digital fashion. This results in a signal that is only stable in discrete portions of the analog signal.

A typical solution to this problem is to scale the data digitally, in both the horizontal and vertical directions. In the above example, the 640 samples per line must be scaled to result in 800 samples per line, and the 480 lines must be scaled to result in 600 lines. Additionally, just as graphics data is scaled up from 640×480 to 800×600, it can also be scaled down. These scaling operation are typically performed by a programmable video processor, such as the Scan-line Video Processor (SVP) manufactured by Texas Instruments, or processing chips such as the Genesis 833.

Due to cost and real-time processing restraints, scaled images such as that discussed above, appear blurry or soft due to the use of a low-complexity scaling implementation. Graphics images have a tendency to have sharp edges, which become noticeably blurred.

Therefore, a method for enhancing image sharpness for resized graphics is needed.

SUMMARY OF THE INVENTION

One aspect of the invention is an RGB sharpness filter to eliminate softness or blurring in a scaled graphics image. Highpass filters extract high pass information from each of the red, green and blue signals, scaled in amplitude and then added back into each color component.

It is an advantage of the invention in that it can be tailored to the performance of the scaling operations being used in a particular system.

It is a further advantage of the invention in that it increases the sharpness of a scaled image, facilitating display of images on different fixed resolution displays.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Being able to display different format graphics images on fixed resolution displays offers several advantages. Electronic transmission of images between users of different resolution displays, or different sources of graphics images, becomes much easier. However, since these images are created digitally, they cannot be resampled to adjust for different display resolutions. Image scaling in both the horizontal and vertical directions must be performed digitally. The resulting image will more than likely have soft and blurred edges where edges in the original image were sharp.

Figure 1:
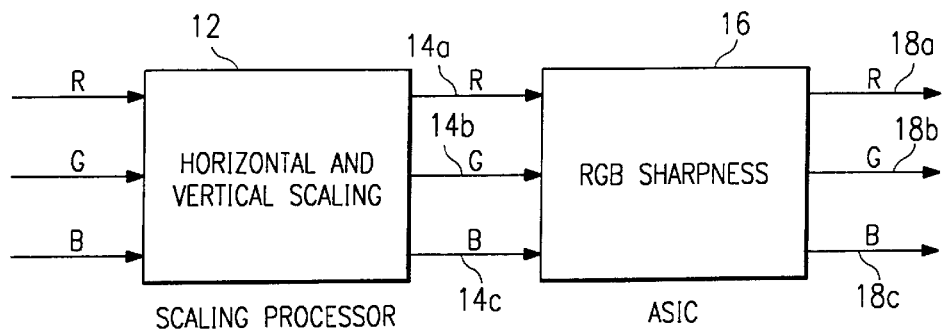
FIG. 1 shows a block diagram of an RGB sharpness operation during processing of graphics images.

FIG. 1 shows one embodiment of a method to sharpen these images. Since the source data is graphics images, the method will operate on red-green-blue (RGB) images in most contexts. However, the method is not limited to operation in the RGB realm. Each color of the signal, such as red, will be referred to as the component or component color.

The three components of the signal enter the processor for horizontal or vertical scaling at block 12. The resulting components 14a, 14b, and 14c, are still the component colors, but have the soft or blurred edges mentioned above. At block 16, RGB sharpness is applied. In this embodiment, the sharpness it applied to the RGB signals by an application specific integrated circuit (ASIC), but could be performed in other realms and by other types of processing elements. The resulting RGB signals 18a, 18b and 18c, have sharp edges and more closely approximate the image as it was produced in its original format.

Figure 2:
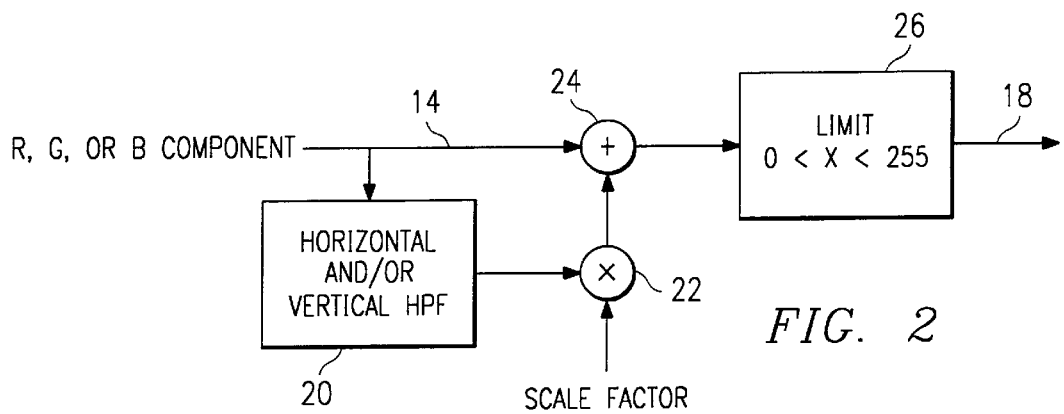
FIG. 2 shows a block diagram of an RGB sharpness operation.

An exanded block diagram of the sharpness block 16 is shown in FIG. 2. The component on line 14 is filtered at block 20, either in the horizontal or vertical directions, or both, to extract the high frequency information. This high frequency information contains edge information. This information is then scaled in amplitude by the scale factor applied at 22. The scale factor depends upon the relationship of the format of the image to the resolution of the display upon which it is to be projected. For example, an image created in VGA format having a resolution of 640×480 pixels is to be displayed on a display having a resolution of 800×600 pixels. The horizontal scale factor is 640:800, or 4:5, as is the vertical scale factor of 480:600. For every four pixels of original resolution, 5 pixels must be displayed.

After the high frequency information is scaled at 22, it is recombined with the original component signal at 24. Since the scaling can result in too many bits per pixel, or more values than 256 values for pixel, the data must be limited to 256 values at 26. Of course, this is not restricted to 256 values, but in this example, the system has 8 bits of data per pixel. In other systems the limit could be 512, or 1024.

Finally, the scaled and sharpened data is sent on for display on line 18. This approach uses a post-processing step after scaling that is unique. The resulting data has sharp edges, more closely approximating the original image. Additionally, it can be tailored to the nature of the system in which it is to be used. For example, the filtering at step 20 could be only in the horizontal direction, not in the vertical. This selection determines the added complexity of the system.

Figure 3:
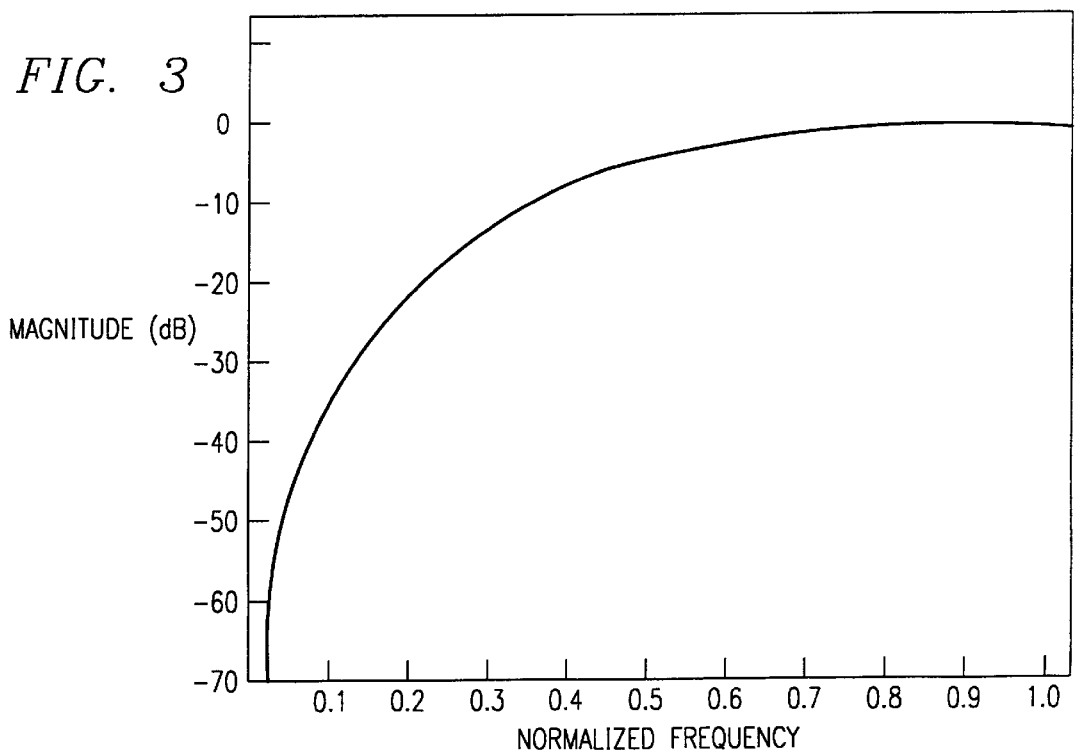
FIG. 3 shows a frequency response of one embodiment of a filter used in RGB sharpening.

For example, in a lower cost system, a three tap horizontal filter could be used. This will increase the sharpness, while not appreciably increasing the cost or slowing down the processing time. An example of the frequency response of such a filter is shown in FIG. 3, with taps at −0.25, 0.50, −0.25.

Thus, although there has been described to this point a particular embodiment for a method for sharpening scaled graphics image data, it is not intended that such specific references be considered as limitations upon the scope of this invention except in-so-far as set forth in the following claims.

What is claimed is:

1. A method for processing graphics image data, comprising the steps of:

scaling said graphics image data from a first format to a second format, filtering each component of said data, to extract high pass information from each said component;

scaling in amplitude, the high pass information from each said component, producing scaled high pass component signals; and recombining each of said scaled high pass component signals with its corresponding component.

2. The method of claim 1 wherein said first format has a lower resolution than said second format.

3. The method of claim 1 wherein said second format has a lower resolution than said first format.

4. The method of claim 1 wherein said filtering step is performed in the horizontal and vertical directions.

5. The method claim 1 wherein said filtering step is performed in only the horizontal direction.

6. The method of claim 1 wherein said filtering step is performed only in the vertical direction.

7. The method of claim 1 wherein said components are red, green and blue components of said data.

* * * * *

UNITED STATES PATENT AND TRADEMARK OFFICE
CERTIFICATE OF CORRECTION

PATENT NO.   : 6,229,520 B1
DATED        : May 8, 2001
INVENTOR(S)  : Todd A. Clatanoff and Vishal Markandey It is certified that error appears in the above-identified patent and that said Letters Patent is hereby corrected as shown below:

<u>Title page,</u>
Insert Item:

[60]           -- Related U.S. Application Data

Provisional Application No. 60/035,878 Jan. 21, 1997. --

Signed and Sealed this

Twenty-ninth Day of April, 2003

JAMES E. ROGAN
*Director of the United States Patent and Trademark Office*